United States Patent

[11] 3,552,497

[72] Inventor Robert N. Stedman
 Chillicothe, Ill.
[21] Appl. No. 728,026
[22] Filed May 9, 1968
[45] Patented Jan. 5, 1971
[73] Assignee Caterpillar Tractor Co.
 Peoria, Ill.
 a corporation of California

[54] UNITIZED SIDE-BY-SIDE TRACTOR AND RIPPER COMBINATION
 7 Claims, 4 Drawing Figs.
[52] U.S. Cl. .................................................. 172/292,
 172/484, 172/699, 172/801, 180/14
[51] Int. Cl. ...................................................... A01b 51/02,
 E02f 3/12, B60d 1/16
[50] Field of Search .......................................... 180/6.4,
 14.; 172/699, 292, 677, 762, 803, 809, 484, 196,
 801; 37/4, 8

[56] References Cited
UNITED STATES PATENTS

| | | | |
|---|---|---|---|
| 1,310,604 | 7/1919 | Burgess .................. | 180/14 |
| 3,031,175 | 4/1962 | Wooldridge .................. | 172/292 |
| 3,477,534 | 11/1969 | Ladwig, Jr. .................. | 180/14 |

Primary Examiner—Robert E. Pulfrey
Assistant Examiner—Stephen C. Pellegrino
Attorney—Fryer, Tjensvold, Feix, Phillips & Lempio ABSTRACT: A pair of tractors are disposed in side-by-side relationship and are coupled together for unitized operation by front, rear and diagonal cross bracing which provides for a limited amount of transverse and longitudinal oscillation of either tractor relative to the other. The rear cross brace structure is defined in part by ripper tooth-mounting members in an arrangement which does not block the independent oscillation of either tractor.

PATENTED JAN 5 1971

3,552,497

INVENTOR
ROBERT N. STEDMAN

ATTORNEYS

INVENTOR
ROBERT N. STEDMAN 10 3,552,497

UNITIZED SIDE-BY-SIDE TRACTOR AND RIPPER COMBINATION

CROSS REFERENCE TO RELATED APPLICATION

Copending application Ser. No. 635,803, of Robert A. Peterson, et al. for "Side By Side Tractor Combination" filed May 3, 1967 and assigned to the assignee of the present application.

BACKGROUND OF THE INVENTION

This invention relates to powered earthworking apparatus and more particularly to the mounting of ripper teeth on unitized multiple tractor combinations.

The conventional ripper is generally a removable attachment which is rigidly fixed to the back end of the tractor vehicle and which carries one or more heavy downwardly directed teeth for the purpose of disrupting hard ground in order that it may then be more readily worked by other implements. While the conventional ripper attachment has proved to be a very useful tool in conjunction with single tractors, it is not readily adaptable to certain recently developed tractive units which consist of a plurality of tractor vehicles coupled together for unitized operation in order to provide greater tractive force.

The above identified copending application Ser. No. 635,803 discloses a particularly advantageous system of this kind wherein two or more tractor vehicles are disposed in a side by side relationship and coupled together for operation as a single tractive device. A very useful and significant characteristic of the unitized tractors as described in the copending application is a unique arrangement of cross bracing for coupling the two tractors to maintain forced parallelism and a fixed longitudinal relationship while providing for a limited amount of independent oscillation of each tractor relative to the other. This includes a forward cross brace at the front of the tractors, which may advantageously be a working implement such as a bulldozer blade, a rear cross brace at the back of the tractors, and a diagonal brace extending therebetween. The several joints between the tractors and braces are of the ball and socket or universal type thereby providing for both transverse or longitudinal oscillation of either tractor in response to terrain irregularities while forcibly holding the two tractors in a substantially parallel relationship and a substantially fixed longitudinal relationship.

The disposition of ripper teeth on a unitized side by side tractor combination is subject to several unique difficulties. Conventional practice would appear to dictate that a ripper attachment of sufficient span be rigidly attached to the back end of both tractors. However, this would prevent the desired independent oscillation of each tractor. As a practical matter, the ripper attachment would be subjected to very severe stresses in such an arrangement. If a smaller conventional ripper attachment is carried on only one or the other of the side by side tractors, the resistive load force on the two tractors is unequal in a way which may adversely effect the desired unitized operation and independent oscillations thereof. Further the unitized tractor combination requires rear cross bracing which may interfere with a conventional ripper arrangement on one or both of the tractors.

SUMMARY OF THE INVENTION

The present invention provides a unitized side by side multiple tractor and ripper combination in which the ripper elements do not block limited independent oscillation of either tractor. The invention further provides for equalized ripper load forces on the tractors under normal conditions and, in addition acts to reduce unwanted lateral or forward tilting of the ripper teeth in response to oscillation of the tractors. In particular, the present invention effects these results by advantageously combining the ripper elements and the rear cross bracing needed to link the tractors for unitized operation.

Accordingly it is an object of this invention to provide for the mounting of ripper teeth on unitized side by side tractor combinations.

It is another object of this invention to provide a coupled side by side tractor and ripper combination wherein the ripper elements do not block independent oscillation of either tractor and wherein undesired movement of the ripper teeth in the presence of tractor oscillations is minimized.

It is still another object of the invention to provide a unitized dual tractor and ripper combination wherein the load force of the ripper teeth is substantially equalized between the two tractors and wherein the weight of both tractors is available to aid penetration of the ripper teeth.

The invention, together with further objects and advantages thereof will best be understood by reference to the following description of preferred embodiments in conjunction with the accompanying drawings.

BRIEF DESCRIPTION OF THE DRAWINGS

In the accompanying drawings:

FIG. 3 is a perspective view of a second embodiment of the invention wherein a plurality of ripper teeth are provided for.

DESCRIPTION OF PREFERRED EMBODIMENTS

Figure 1:
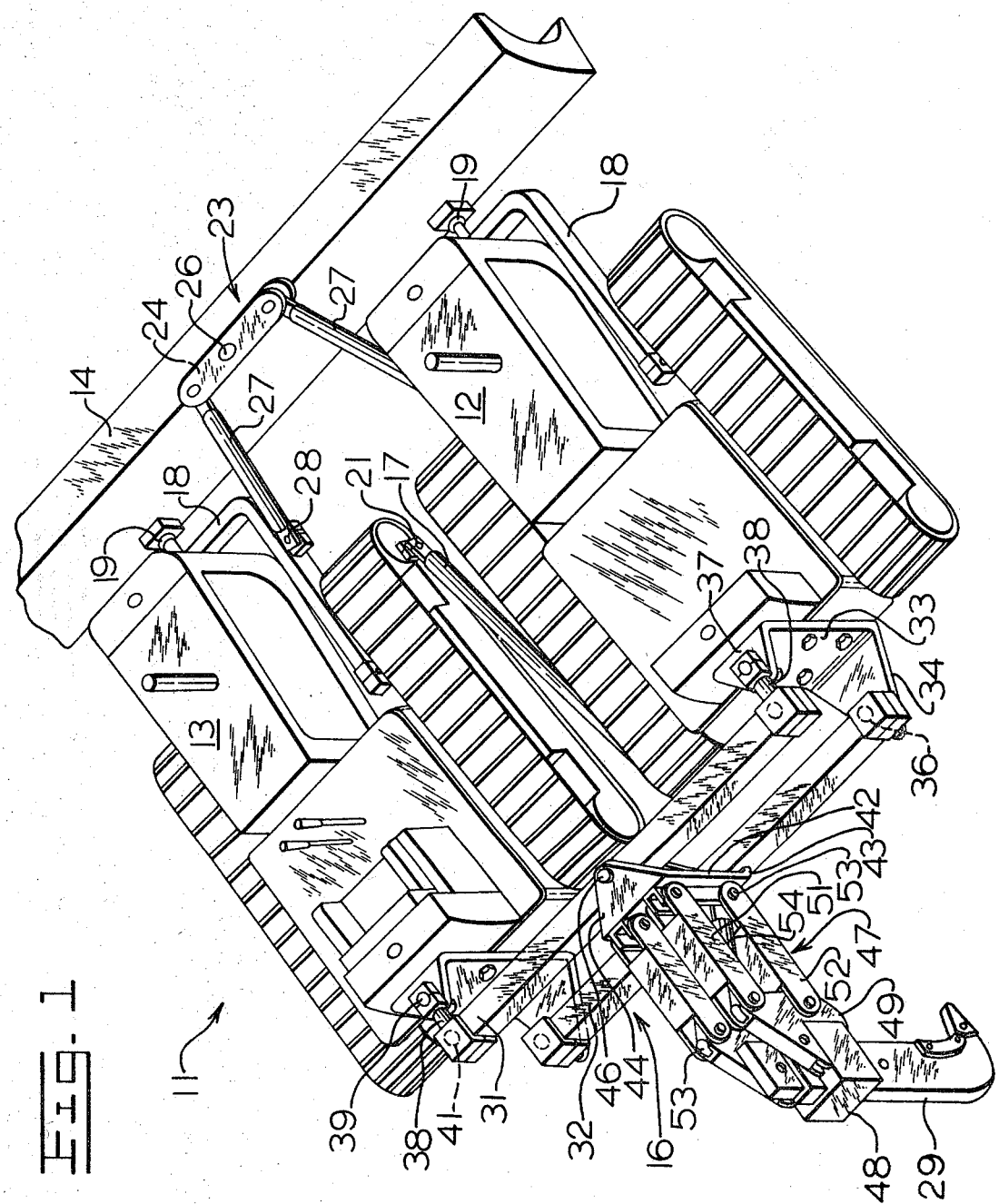
FIG. 1 is a perspective view of a unitized side by side tractor combination embodying the invention.

Referring now to FIG. 1 of the drawings in particular, there is shown a unitized side by side tractor combination 11 comprised of right-hand and left-hand tractors 12 and 13 respectively linked together for operation as a single tractive unit in the general manner described in the above identified copending application Ser. No. 635,803. As described in detail therein, unitized tractors of this kind are cross connected at the front by a cross brace, which may advantageously be a working implement such as a bulldozer blade 14, and are connected at the rear by cross bracing which in the present invention is a ripper construction 16 to be more fully described hereinafter.

The front and rear cross bracing provided by blade 14 and ripper construction 16 maintains a forced parallelism of the two tractors 12 and 13 in the presence of uneven load forces thereon, unbalanced resistance to forward motion of the two tractors, slight differences of speed or traction, or other factors which would tend to diverge or converge the tractors in operation. To maintain the desired side by side relationship of the two tractors 12 and 13 in the presence of such factors, a diagonal brace 17 extends between the adjacent sides of the two tractors and is connected to a forward portion of one of the tractors, tractor 13 in this instance, and to a rearward portion of the other tractor. Thus the two tractors are locked against any significant degree of divergence, convergence or relative movement in a longitudinal direction.

In the absence of further provisions, the above described bracing structure which couples the two tractors would be subjected to very severe stresses in the presence of terrain irregularities, unbalanced load forces and the like and would therefore require massive construction. To avoid this problem, the several connections between the tractors and the members which couple the two tractors are made by means of universal joints thereby providing for a limited amount of independent oscillation of either tractor about either a longitudinal axis or a transverse axis. In particular, the front cross brace or blade 14 is coupled to push arms 18 of each tractor by a separate ball and socket joint 19, diagonal brace 17 couples to both tractors by universal means such as ball and socket joints 21, and the cross bracing defined by the ripper construction 16 couples to the rear of both tractors at ball and socket joints 36 and 39 which will hereinafter be described more fully. To maintain the bulldozer blade 14 in an upright position without inhibiting the desired oscillatory movement of either tractor, a singletree arrangement 23 is employed.

The singletree 23 comprises a lever 24 coupled to the back of blade 14 at a pivot 26 at the center of the lever and at a point midway between the tractors 12 and 13 above the push arms 18. One of a pair of links 27 is pivotably coupled to each end of lever 26 and extends downward and rearward to a ball and socket joint 28 by which it is coupled to the inner push arm 18 of the adjacent one of the two tractors. The singletree 23 holds the blade 14 in a generally upright position while allowing either one of the tractors to oscillate as described above.

The ripper construction 16 in this particular example is of the type which employs a single very large ripper tooth 29 designed for penetrating very hard ground to a substantial depth without overloading the tractor unit 11. To support the ripper tooth 29 and to cross brace the tractors 12 and 13 at the back end thereof as described above, the ripper construction 16 has vertically spaced, parallel upper and lower braces 31 and 32, respectively.

It may be observed that if two such vertically spaced cross braces were fixedly coupled to the backs of the two tractors, the ripper structure would inhibit oscillatory motion of one tractor relative to the other. This would be true to some extent even if both cross braces were coupled to the tractors by simple universal joints. The present invention provides a unique attachment of the two cross braces 31 and 32 to the associated tractors which avoids this undesirable result.

Figure 2:
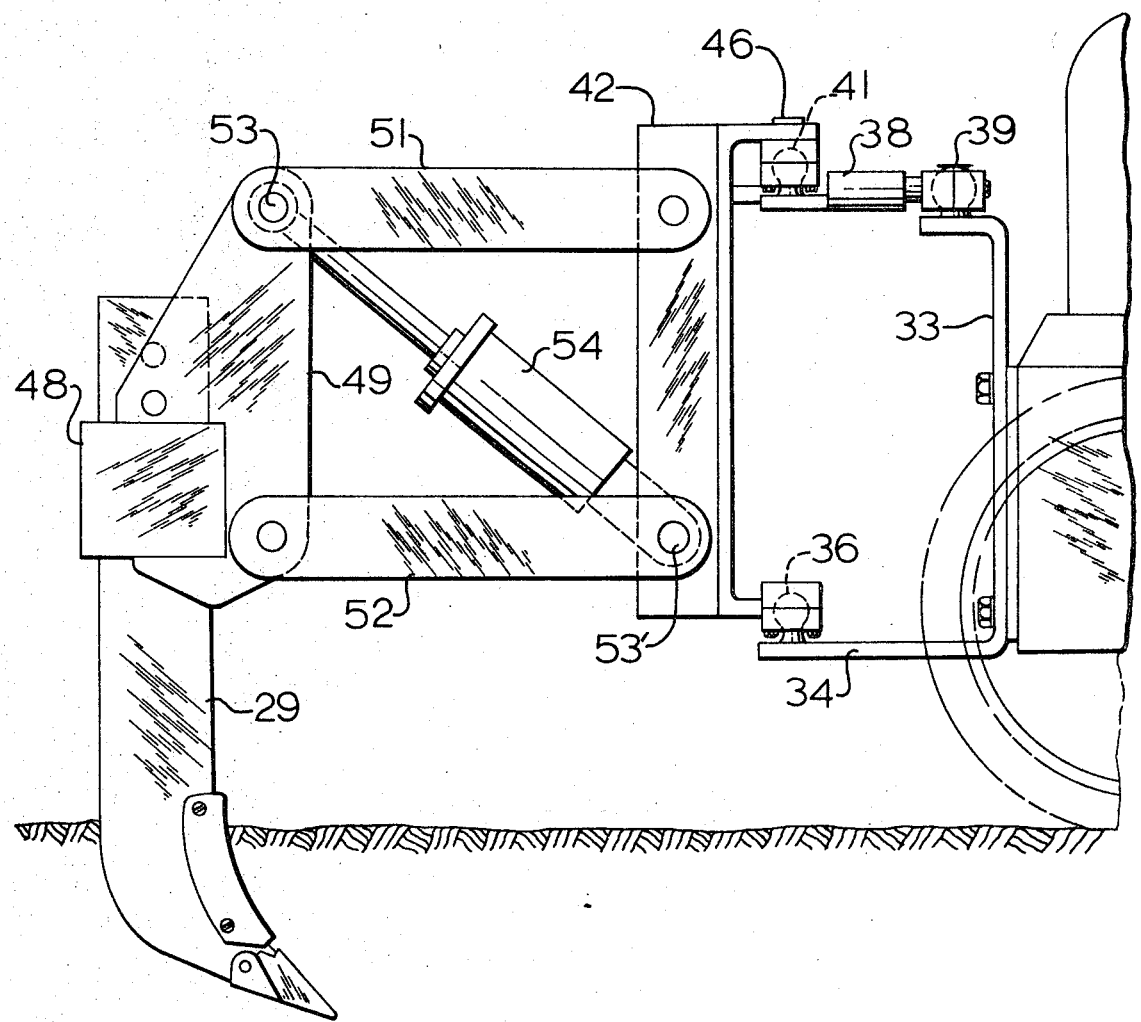
FIG. 2 is a side elevation view of the rear portion of the apparatus of FIG. 1.

Referring now to FIG. 2 in conjunction with FIG. 1, a mounting bracket 33 is rigidly secured to the back end of each of the tractors 12 and 13 and each such bracket has an angled rearwardly projecting lower end 34. Each end of the lower cross brace 32 is coupled to the projecting lower end 34 of one of the brackets 33 by a ball and socket joint 36. With this arrangement, the upper cross brace 31 is needed to support the ripper tooth 29 as the resistance encountered by the tooth tends to rotate the lower cross brace 32. However the upper cross brace 31 is not coupled to the mounting brackets 33 in the same manner as the lower cross brace, as this would inhibit independent oscillatory motion of the tractors 12 and 13 about a longitudinal axis. Accordingly, the ends of the upper cross brace 31 are coupled to the associated tractor through a double jointed structure. In particular each mounting bracket 33 has an angled rearwardly projecting upper end 37 of less length than the lower end 34 and a short rearwardly extending link 38 is coupled to each such projection 37 by a ball and socket joint 39. The opposite rearward end of each short link 38 connects with the adjacent end of upper cross braces 31 at an additional ball and socket joint 41, the links being proportioned to locate joints 41 on a vertical line extending through the joint 36 at the corresponding end of the lower cross brace 32 (when both tractors are at rest on a flat surface). By coupling the upper cross brace 31 to the tractors 12 and 13 in this manner, either tractor is free to oscillate independently about a longitudinal axis as the short links 38 may pivot about the associated joints 39 and 41 to accommodate such motion without forcing a corresponding movement of the other tractor through the upper cross brace.

To attach the ripper tooth 29 to both the upper and lower cross braces 31 and 32 without interfering with the above-described action, a support bracket 42 extends vertically between the two cross braces at a central position thereon. Support bracket 42 has a lower end 43 which may be rigidly secured to the back surface of the lower cross bar 32 whereas the upper end 44 of the support bracket is angled forwardly and is coupled to the top surface of upper cross brace 31 in a pivotal manner by a vertical pin 46.

Tooth 29 is preferably joined to the support bracket 42 by a parallelogram linkage 47 which provides for selectively raising and lowering the tooth 29 while maintaining the tooth in a substantially perpendicular position. For this purpose the shank of tooth 29 may be fastened to a support block 48 having a pair of upright brackets 49 secured thereto. Each upright bracket 49 is coupled to support bracket 42 by an upper draft link 51 and a parallel lower draft link 52 with all connections between brackets 42 and 49 and draft links 51 and 52 being made by pivot couplings 53 which pivot about axes parallel to the cross braces 31 and 32. In order to raise or lower ripper tooth 29 by changing the parallelogram defined by the above-described members, a pair of double-acting hydraulic jacks 54 are connected between diagonally opposite corners thereof. In this instance, the jacks 54 connect between the pivots 53 at the upper ends of brackets 49 and the pivots 53' at the lower end of support bracket 42.

The above-described structure of FIGS. 1 and 2 has all the desirable properties of a side by side tractor combination wherein the tractors are connected at the rear by a single cross brace. In particular either tractor 12 or 13 may undergo a limited amount of independent oscillation about either a horizontal or longitudinal axis, or a combination of such oscillations, as dictated by terrain irregularities or the like. Notwithstanding this freedom of movement, the ripper tooth 29 is strongly supported in an effective orientation. Sideward or forward and rearward tilting of the ripper tooth in the presence of oscillatory movement of either tractor is minimized. Further, it should be noted that the weight of both tractors 12 and 13 normally bears down on the ripper tooth 29 to aid in penetrating the tooth into hard ground. Still further, it should be observed that the resistive force experienced by the ripper tooth 29 is normally evenly distributed between the two tractors 12 and 13 therefore has little tendency to interfere with the unitized operation thereof.

Figure 3:
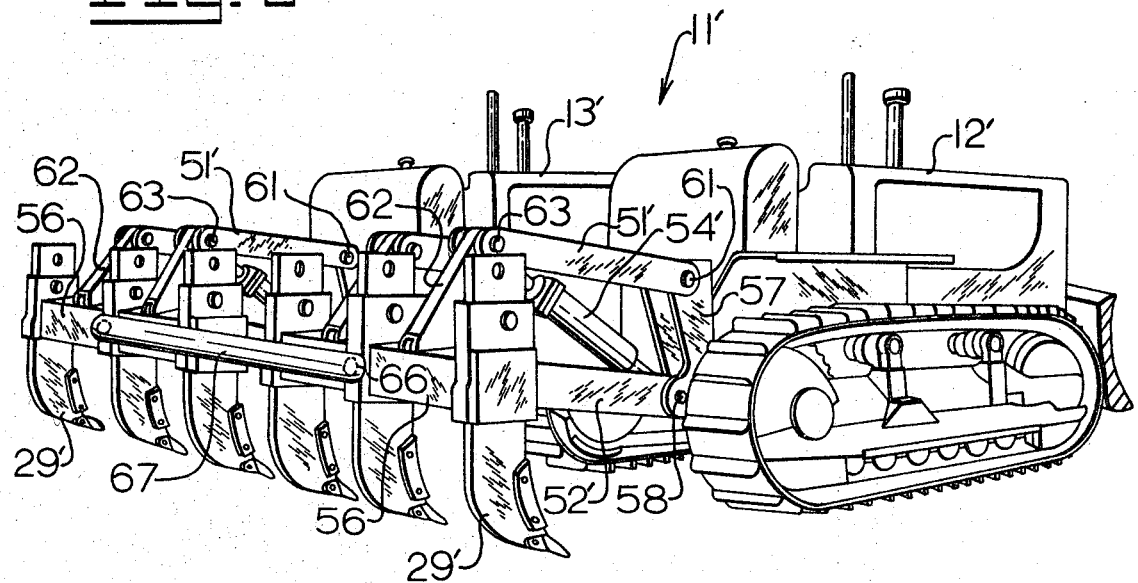
Figure 4:
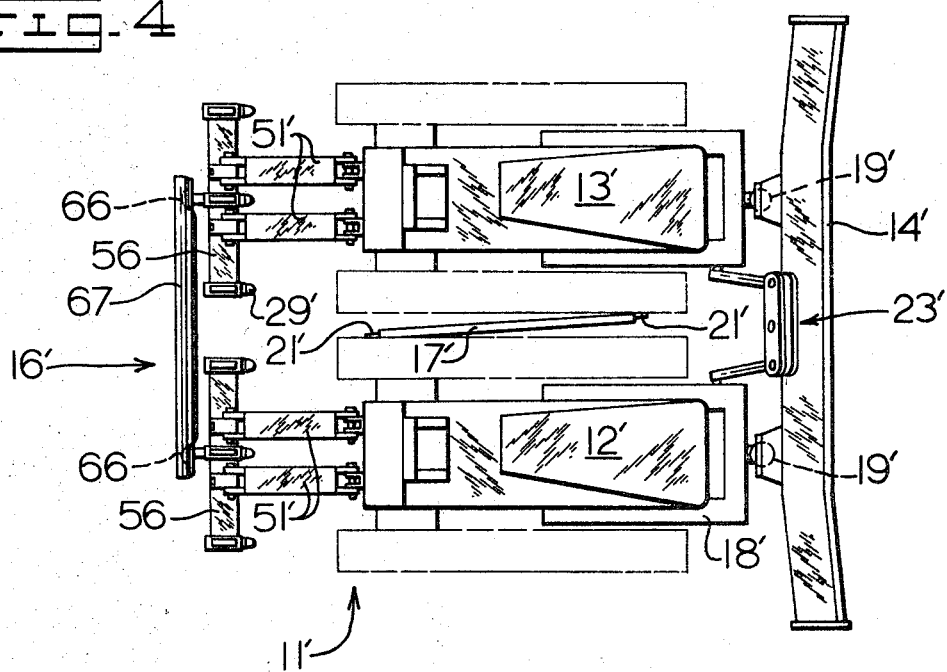
FIG. 4 is a plan view of the apparatus of FIG. 3 further clarifying the construction thereof.

The construction described above with reference to FIGS. 1 and 2 can readily be adapted to the mounting of additional ripper teeth. However, if the multiple teeth are to be distributed across a wide span relative to the lateral dimension of the coupled tractors, a different construction may be desirable. FIGS. 3 and 4 illustrate an embodiment of the invention in which a wide span is provided while still utilizing the ripper elements as components of the cross bracing at the rear of the tractors.

The forward portions of the unitized tractor combination of FIGS. 3 and 4 may be essentially similar to that previously described with reference to FIGS. 1 and 2 and thus include right-hand and left-hand tractors 12' and 13', respectively, coupled together at the forward ends by a crossmember here constituted by a bulldozer blade 14'. As in the previous instance, blade 14' is coupled to the two tractors through push arms 18' and universal joints 19' and a singletree construction 23' maintains the blade in a position. Similarly, a diagonal brace 17' extends between a forward portion of left-hand tractor 13' and a rearward portion of right-hand tractor 12' and is coupled to each tractor by means of a ball and socket joint 21'.

The necessary cross bracing at the rear of the tractors 12' and 13' is again defined in part by the ripper tooth support mechanism 16'. In this example, six-ripper teeth 29' are carried by the unitized tractor assembly 11' with the teeth being distributed across a span approximately similar to that of the two tractors.

The six teeth 29' are divided into two groups of three with each group being carried on a transverse draft beam 56 at the rear of separate ones of the two tractors 12' and 13'. The two draft beams 56 are in alignment when the tractors 12' and 13' are resting on a flat surface and each is coupled to the back end of the associated tractor by a pair of parallel lower draft links 52'. Each lower draft link 52' connects to a separate one of a pair of brackets 57 which are secured to the rear of the associated tractor with the connections to both bracket 57 and to draft beam 56 being made by pivots 58 which provide for pivoting of the draft links in a vertical direction. Each draft beam 56 is also coupled to the rear of the associated tractor by a pair of upper draft links 51' which are situated above and parallel to the lower draft links 52'. Each upper draft link 51' connects to one of the brackets 57 at a pivot coupling 61 and connects to an upwardly extending bracket 62 secured to the associated draft beam 56 with the connections between the upper draft links 51' and brackets 62 also being pivotable joints 63.

The above-described structure comprised of upper and lower draft links 51' and 52' and brackets 57 and 62 again define a parallelogram structure which maintains the ripper teeth 29' on the associated draft beam 56 in a substantially vertical alignment while allowing the teeth to be raised and lowered. Such vertical positioning of the teeth 29' is provided for by hydraulic jacks 54' which connect between the pivot joint 63 at the back end of upper links 51' and the pivot joint 58 at the more forward end of the associated lower draft link 52'. As the jacks 54' in effect define a diagonal of the parallelogram, extension of the jacks raises the ripper teeth 29' while contraction of the jacks lowers the teeth.

To complete the cross bracing at the rear of the tractors 12' and 13' without blocking independent oscillation of each thereof, a ball and socket joint 66 is situated at the rear of each draft beam 56 at the central vertical plane of the associated tractor 12' or 13' to connect in a universal manner with opposite ends of a transverse rear cross brace 67. Thus cross brace 67, acting through the ripper linkage, maintains a fixed spacing of the rear portions of the two tractors. It may be noted that oscillation of either tractor affects only the three-ripper teeth 29' which are directly associated therewith.

While the invention has been disclosed with respect to certain specific embodiments, it will be apparent that many modifications are possible. Accordingly it is not intended to limit the invention except as defined in the following claims.

I claim:

1. Powered earthworking apparatus comprising:
    a pair of tractors disposed in side by side relationship for operation as a unitized combination;
    cross bracing holding said tractors in a substantially parallel relationship while providing for limited independent oscillation of each tractor about a longitudinal axis therethrough and holding said tractors in a substantially fixed longitudinal relationship while providing for limited independent oscillation of each tractor about a transverse axis therethrough, said cross bracing being comprised in part of a pair of spaced-apart rear cross brace members each being coupled at each end to each of said tractors by universal joint means;
    a ripper tooth support extending between said pair of said cross braces and being coupled to each thereof; and
    at least one ripper tooth carried by said support.

2. The combination defined in claim 1 wherein said support is situated midway between said tractors.

3. The combination defined in claim 1 wherein said universal joint at each end of one of said rear cross braces is coupled to the associated one of said tractors through a short link having an additional universal joint connection to said associated tractor.

4. The combination defined in claim 3 wherein said rear cross braces are vertically spaced-apart and wherein said one of said cross braces is the upper one thereof.

5. The combination defined in claim 3 wherein said support bracket is pivotably coupled to said one of said rear cross braces and rigidly coupled to the other thereof.

6. Powered earthworking apparatus comprising:
    a pair of tractors disposed in side by side relationship for operation as a unitized combination;
    cross bracing holding said tractors in a substantially parallel relationship while providing for limited independent oscillation of each tractor about a longitudinal axis therethrough and holding said tractors in a substantially fixed longitudinal relationship while providing for limited independent oscillation of each tractor about a transverse axis therethrough, said cross bracing being comprised in part of draft linkage coupled to the rear of each tractor for pivoting movement about a transverse axis thereof;
    a pair of transverse draft beams one being coupled to each of said tractors through said draft linkage at the rear thereof and each carrying at least one ripper tooth; and
    a rigid rear cross brace extending transversely with respect to said tractors and being coupled to each of said draft beams by universal joint means.

7. The combination defined in claim 6 wherein said universal joint means at each end of said rigid rear cross brace is centered with respect to the transverse span of the associated tractor.